United States Patent
Rhee et al.

(10) Patent No.: US 9,864,419 B2
(45) Date of Patent: Jan. 9, 2018

(54) HANDHELD DEVICE WITH HEAT PIPE

(71) Applicants: Samsung Electronics Co., Ltd., Gyeonggi-do (KR); TTM, Co. Ltd., Gyeonggi-do (KR)

(72) Inventors: Bongjae Rhee, Gyeonggi-do (KR); Chunghyo Jung, Gyeonggi-do (KR); Eugene Choi, Gyeonggi-do (KR)

(73) Assignees: SAMSUNG ELECTRONICS CO., LTD., Suwon-si (KR); TTM CO., LTD., Suwon-si (KR)

( * ) Notice: Subject to any disclaimer, the term of this patent is extended or adjusted under 35 U.S.C. 154(b) by 35 days.

(21) Appl. No.: 14/614,296

(22) Filed: Feb. 4, 2015

(65) Prior Publication Data

US 2015/0220122 A1 Aug. 6, 2015

(30) Foreign Application Priority Data

Feb. 4, 2014 (KR) ........................ 10-2014-0012644

(51) Int. Cl.
*G06F 1/20* (2006.01)
*G06F 1/16* (2006.01)

(52) U.S. Cl.
CPC ............ *G06F 1/203* (2013.01); *G06F 1/1626* (2013.01); *G06F 1/1656* (2013.01)

(58) Field of Classification Search
CPC ....................................................... G06F 1/203
USPC ........................................ 361/679.26, 679.47
See application file for complete search history.

(56) References Cited

U.S. PATENT DOCUMENTS

| | | | | |
|---|---|---|---|---|
| 6,212,074 | B1* | 4/2001 | Gonsalves | H01L 23/4006 165/185 |
| 6,946,216 | B2* | 9/2005 | Mu-Tsai | H01M 2/1022 429/120 |
| 7,545,646 | B2* | 6/2009 | Holmberg | F28D 15/0266 165/80.2 |
| 2010/0155030 | A1* | 6/2010 | Hwang | F28D 15/0233 165/104.26 |
| 2011/0149537 | A1 | 6/2011 | Kurosawa | |
| 2012/0182694 | A1 | 7/2012 | Lin et al. | |
| 2012/0307452 | A1 | 12/2012 | Yan et al. | |

(Continued)

FOREIGN PATENT DOCUMENTS

EP 2 613 353 A1 7/2013
KR 10-2014 0000933 A 1/2014

OTHER PUBLICATIONS

Extended European Search Report dated Sep. 25, 2015 in connection with European Application 15153649.7; 6 pages.

*Primary Examiner* — Tuan T Dinh
*Assistant Examiner* — Mukund G Patel

(57) ABSTRACT

A handheld device including a circuit board including at least one electronic component, a heat pipe disposed on the electronic component to absorb heat generated from the electronic component and to release the absorbed heat in a direction opposite to the electronic component, and a heat sinking material configured to bond the circuit board and the heat pipe to each other. The heat pipe includes an evaporation section disposed on the main processor to absorb heat generated from the main processor, a connection section disposed on a side region of the main board to transfer the absorbed heat in a direction opposite to the main processor, and a condensation section configured to release the transferred heat.

18 Claims, 20 Drawing Sheets

(56) References Cited

U.S. PATENT DOCUMENTS

2013/0094141 A1    4/2013  Degner et al.
2013/0250504 A1*  9/2013  Choi ........................ G06F 1/203
                                                            361/679.26

* cited by examiner

HANDHELD DEVICE WITH HEAT PIPE

CROSS-REFERENCE TO RELATED APPLICATION(S) AND CLAIM OF PRIORITY

The present application is related to and claims priority from and the benefit under 35 U.S.C. §119(a) of Korean Patent Application No. 10-2014-0012644, filed on Feb. 4, 2014, which is hereby incorporated by reference for all purposes as if fully set forth herein.

TECHNICAL FIELD

The present disclosure relates to a device that dissipates heat using a heat pipe.

BACKGROUND

A heat pipe refers to a heat transfer component that makes use of a principle that, when evaporation and condensation of a medium are repeated within a pipe, heat may be transferred from a heating segment to a heat radiating segment. More specifically, a heat pipe is manufactured by reducing the pressure in the inside of a pipe and introducing a liquid, such as water or alcohol, into the pressure-reduced inside of the pipe. When a heat segment is heated, the liquid is vaporized into vapor and the vapor flows to the other side, and when the vapor releases heat to be condensed to liquid, the liquid returns back to the heating segment again due to a capillary phenomenon.

SUMMARY

To address the above-discussed deficiencies, it is a primary object to provide a handheld device according to an embodiment of the present disclosure includes a circuit board including at least one electronic component, a heat pipe disposed on the electronic component to absorb heat generated from the electronic component and to release the absorbed heat in a direction opposite to the electronic component, and a heat sinking material configured to bond the circuit board and the heat pipe to each other.

A handheld device according to another embodiment of the present disclosure includes a main board on which a main processor is mounted, an auxiliary board including at least one electronic component at a position opposite to the main processor, a heat pipe including an evaporation section disposed on the main processor to absorb heat generated from the main processor, a connection section disposed on a side region of the main board to transfer the absorbed heat in a direction opposite to the main processor, and a condensation section configured to release the transferred heat, and a battery mounting portion disposed between the main board and the auxiliary board, and provided on a side of the connection section and the condensation section.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
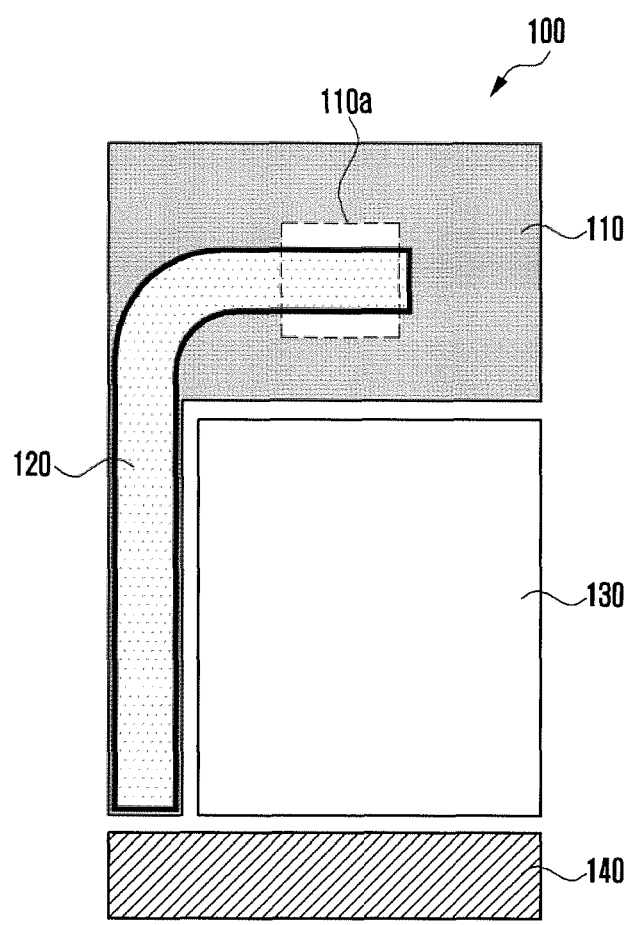
FIG. 1 illustrates a handheld device according to an embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, various embodiments will be described with reference to the accompanying drawings. It should be noted that the same elements will be designated by the same reference numerals although they are shown in different drawings. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

A handheld device according to the present disclosure may be implemented to be included in an electronic device.

An electronic device according to the present disclosure may be a device including a communication function. For example, the electronic device may be a combination of one or more of a smartphone, a tablet personal computer, a mobile phone, a video phone, an e-book reader, a desktop personal computer, a laptop personal computer, a netbook computer, a Personal Digital Assistant (PDA), a Portable Multimedia Player (PMP), an MP3 player, a mobile medical device, an electronic bracelet, an electronic necklace, an electronic accessory, a camera, a wearable device, an electronic clock, a wrist watch, a home appliance (e.g. a refrigerator, an air conditioner, a cleaner, an oven, a microwave oven, a washing machine, a vacuum cleaner, etc.), an artificial intelligent robot, a Television (TV), a Digital Video Disk (DVD) player, an audio player, various medical machines (e.g. a Magnetic Resonance Angiography (MRA), a Magnetic Resonance Imaging (MRI), a Computed Tomography (CT), a tomography camera, a sonography device, etc.), a navigation device, a Global Positioning System (GPS) receiver, an Event Data Recorder (EDR), a Flight Data Recorder (FDR), a set-top box, a TV box (e.g. Samsung HomeSync™, Apple TV™, or Google TV™), an electronic dictionary, a vehicle infotainment device, electronic equipment for a ship (e.g. navigation equipment for a ship, a gyrocompass, etc.), avionic equipment, a security device, an electronic cloth, an electronic key, a camcorder, a game console, a Head-Mounted Display (HMD), a flat panel display device, an electronic frame, an electronic album, a furniture or a part of a building/structure including a communication function, an electronic board, an electronic signature receiving device, a projector, etc. It is obvious to those skilled in the art that the electronic device according to the present disclosure is not limited to the aforementioned devices.

In the past, heat pipes have been applied to electronic apparatuses having a size that is larger than that of an ordinary notebook computer, or electronic apparatuses operated in a forced-cooling type by being combined with a fan, for example, a refrigerator. Due to the large size, the heat pipes have only been applied to electronic apparatuses over a certain size, without being applied to a handheld device. However, as handheld devices are reduced in size and highly improved in performance, heat generation becomes a serious problem. Accordingly, it is necessary to provide a method of solving the heat generation problem of the handheld devices to reduce the entire temperature of the handheld devices.

An embodiment of the present disclosure is to provide a handheld device in which a high heat generation portion and a cold portion are connected with each other by a heat pipe so that the entire temperature can be reduced.

FIG. 1 illustrates a handheld device according to an embodiment of the present disclosure. Referring to FIG. 1, an handheld device 100 includes a circuit board 110 including at least one electronic component 110a, a heat pipe 120 disposed on the electronic component 110a to radiate heat generated from the electronic component 110a, and a heat sinking material configured to bond the circuit board 110 and the heat pipe 120 to each other.

According to an embodiment, the handheld device 100 refers to an appliance which can be used by a user in a hand-held state, and can be at least one of, for example, a smart phone, a tablet PC, a mobile phone, a video phone, an e-book reader, a PDA, a PMP, and an MP3 player.

The circuit board 110 can be referred to as a "mainboard," on which an electronic component 110a is mounted to provide various functions in the handheld device 100. For example, the electronic component 110a can be an Application Processor (AP), a Central Processing Unit (CPU), or a Power Management IC (PMIC). The electronic component 110a is a main heat generating source that generates heat in the handheld device. Accordingly, the heat pipe 120 is disposed on the electronic component 110a to radiate the heat generated from the electronic component 110a to another place.

For example, the heat pipe 120 includes an evaporation section disposed on the electronic component 110a to absorb the heat generated from the circuit board 110, a connection section formed on a side region of the circuit board 110 to transfer the absorbed heat in a direction away from the electronic component 110a, and a condensation section that radiates the heat transferred thereto.

The handheld device 100 can further include a battery mounting unit where a battery 130 is mounted, and an auxiliary board 140. The battery 130 has an important role with the circuit board 110 in the handheld device 100 in that the battery 130 serves to supply power to the handheld device 100. Accordingly, the circuit board 110 and the battery 130 can be formed to be relatively larger than other components. In addition, similarly to the circuit board 110, any other component, which is not mounted on the circuit board 110, can be mounted on the auxiliary board 140.

However, the heat pipe 120 can have a large thickness in order to absorb the heat of the electronic component 110a and radiate the heat to the battery. Considering the width of the handheld device, it is difficult to insert the heat pipe 120 in a case where the heat pipe 120 is configured to directly connect the electronic component 110a to the battery 130. Accordingly, a method of inserting the heat pipe 120 into the handheld device 100 without increasing the thickness of the handheld device 100 is to insert the heat pipe 120 into a region on a lateral side of the battery 130. That is, in the present disclosure, the heat pipe 120, extending from the electronic component 110a serving as a main heat generating source, can be positioned in the region on a side of the battery 130.

According to an embodiment, in order to insert the heat pipe 120 into the lateral side of the battery 130, the connection section can be bent by a predetermined angle from the evaporation section. The predetermined angle can be set depending on the size of the electronic component and the area of the region on the lateral side of the battery on the circuit board 110 in which the connection section is disposed.

In addition, since the heat pipe 120 can be affected by gravity, a structure, in which the circuit board 110 is positioned in a lower portion and the battery 130 is positioned in the upper end portion, can be more advantageous. However, since a 3D game, which can generate excessive heat, is enjoyed in a state where the handheld device 100 is laid horizontally, the handheld device 100 can be less affected by the gravity under a practical use condition. In the state where the handheld device 100 is stood vertically, the performance of the heat pipe 120 can be degraded due to the effect of gravity. However, since the cooling effect by natural convection is improved, the performance degradation of the heat pipe 120 can be compensated.

Figure 2A:
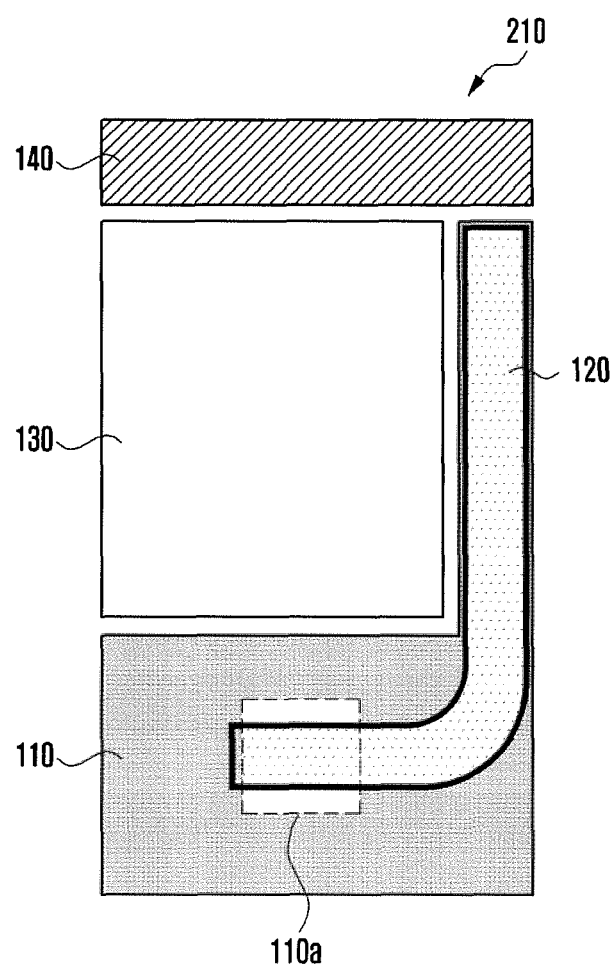
FIGS. 2A to 2C illustrate a handheld device according to another embodiment of the present disclosure.
Figure 2B:
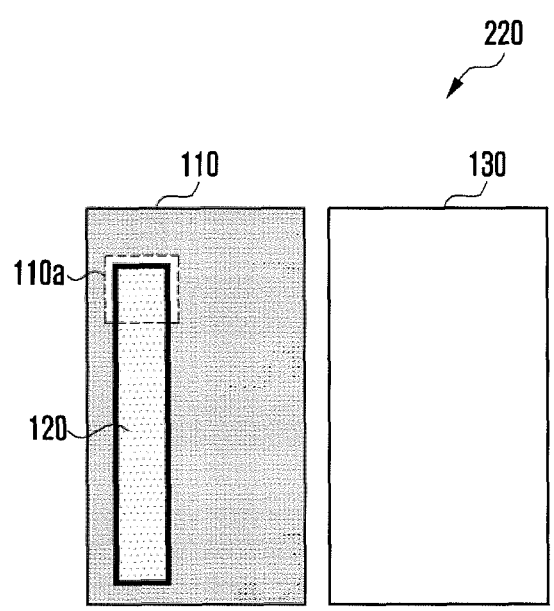
Figure 2C:
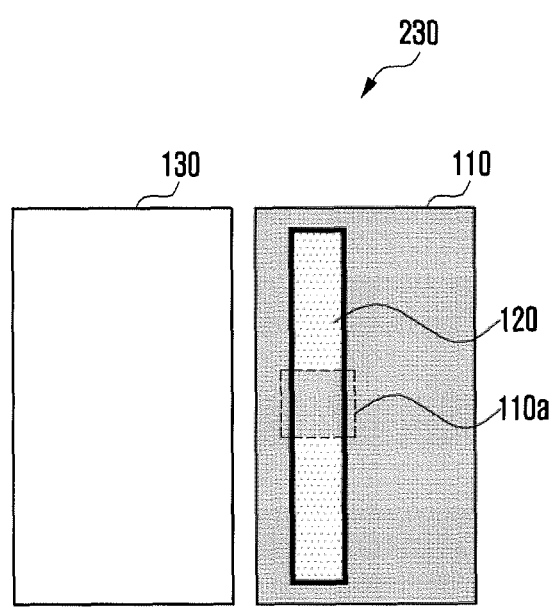

FIGS. 2A to 2C illustrate handheld devices according to the embodiments of the present disclosure. Referring to FIG. 2A to 2C, in a handheld device 210, the circuit board 110 can be disposed in a lower portion, the battery 130 can be disposed in an upper portion with reference to the circuit board 110, the heat pipe 120 can be disposed on a lateral side of the battery 130, and the auxiliary board 140 can be disposed in the uppermost portion. That is, upon comparing the handheld device 210 with the handheld device 100 illustrated in FIG. 1, the positions of the circuit board 110 and the battery 130 can be reversed. Accordingly, the heat pipe 120 can move and radiate the heat, which is generated from the electronic component 110a mounted on the circuit board 110 in a direction away from the electronic component 110a, towards the auxiliary board 140.

In another embodiment, in a handheld device 220, the circuit board 110 and the battery 130 can be disposed to face each other. That is, in the handheld device 220, the circuit board 110 can be disposed on the left and the battery 130 can be disposed on the right. The heat pipe 120 can move and radiate the heat, which is generated from the electronic component 110a on the circuit board 110, towards the lower portion. At this time, the heat pipe 120 can be disposed at a long distance from the battery 130.

In still another embodiment, in a handheld device 230, the battery 130 can be disposed on the left and the circuit board 110 can be disposed on the right so that the circuit board 110 and the battery 130 face each other. The electronic component 110a can be disposed in a central portion of the circuit board 110, and the heat pipe 120 can radiate the heat generated from the electronic component 110a while moving the heat upwardly and downwardly. At this time, the heat pipe 120 can be disposed in a region adjacent to the battery 130.

Figure 3:
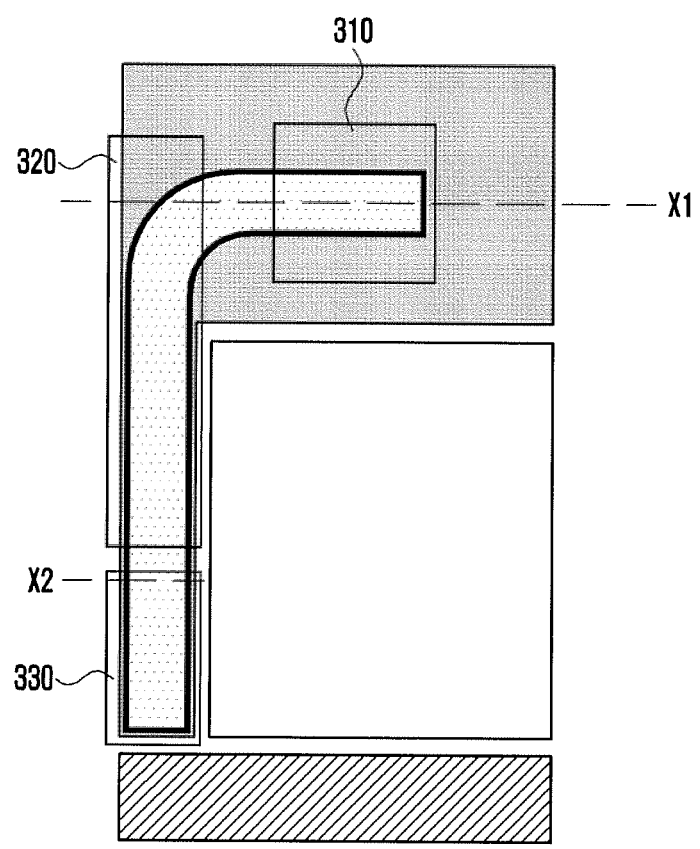
FIG. 3 illustrates an example in which a heat pipe is disposed on a circuit board according to embodiments of the present disclosure illustrated in FIG. 1.

FIG. 3 illustrates an example in which a heat pipe is disposed on a circuit board according to an embodiment of the present disclosure illustrated in FIG. 1.

Referring to FIG. 3, the heat pipe includes an evaporation section 310 disposed on an electronic component to absorb heat generated from the electronic component, a connection section 320 formed on a lateral side of the circuit board to transfer the absorbed heat in a direction away from the electronic component, and a condensation section 330 that radiates the heat transferred thereto. When the evaporation section 310 absorbs the heat generated from the electronic component, the medium therein is vaporized to vapor. The vapor of the medium generated by the absorbed heat can move to the condensation section 330 along the connection section 320. The connection section 320 can be formed between the circuit board and the auxiliary board to be superposed with a side region of the circuit board facing the battery. The vapor vaporised from the medium by the absorbed heat is capable of releasing heat while being condensed to liquid in the condensation section 330. The liquid condensed by releasing the heat is capable of moving again to the evaporation section 310 along the connection section 320. That is, the evaporation section 310 can be disposed adjacent to the electronic component, and the condensation section 320 can be disposed at a longer distance from the electronic component than the evaporation section 310.

Accordingly, the heat pipe is capable of dissipating the heat generated from the circuit board to a position other than the circuit board within the handheld device.

Figure 4A:
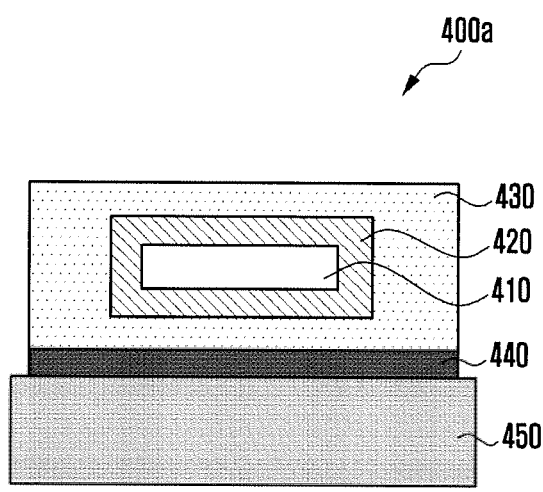
FIGS. 4A to 4C illustrate heat pipes according to embodiments of the present disclosure.
Figure 4B:
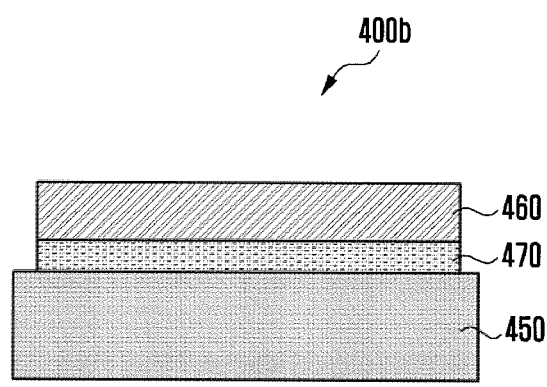
Figure 4C:
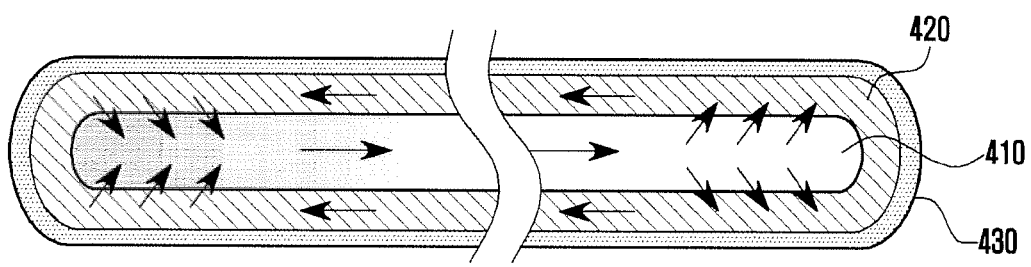

FIGS. 4A and 4C illustrate heat pipes according to an embodiment of the present disclosure.

FIGS. 4A and 4B illustrate the cross-sectional views of a handheld device 400a which is taken along a line corresponding to line X2 in FIG. 3. The portion sectioned along line X2 corresponds to a portion where the connection section of the heat pipe is formed. The heat pipe can include a vapor cavity 410, a wick 420, and a heat conductive member 430.

Referring to FIG. 4C, upon absorbing heat from the circuit board 450, the phase of the medium is changed to vapor in the vapor cavity 410. The medium changed to vapor moves to the condensation section along the vapor cavity 410 so that the absorbed heat is released from the medium. The wick 420 surrounds the vapor cavity 410, and the vaporized medium releases heat in the condensation section to be subjected to phase change so that the vaporized medium is changed to liquid. The medium changed to liquid is transferred to the evaporation section again along the wick 420. The heat conductive member 430 is formed to surround the wick 420. The heat conductive member 430 serves to enhance heat conductivity. The heat conductive member 430 can be made of at least one of aluminum (Al), copper (Cu), silver (Ag), titanium (Ti), chrome (Cr), gold (Au), carbon (C), nickel (Ni), ferrite (Fe), platinum (Pt), graphite and boron nitride (BN), or a combination thereof.

Referring back to FIGS. 4A and 4B, the side region of the circuit board, on which the connection section circuit board 450 is provided, is a narrow portion that is positioned on a lateral side of the battery to interconnect the circuit board 450 and the auxiliary board. The side region is referred to as an ax handle-shaped portion due to its shape and is weak due to its narrow width. Accordingly, the side region can be broken in the process of assembly and handling. Accordingly, in a conventional handheld device 400b, the circuit board 450 is lined with a reinforcing plate 460 made of a material of a ferrite component in order to reinforce the region of the circuit board. At this time, the reinforcing plate 460 is well bonded to the circuit board 450 through solder 470. Whereas, in the handheld device 400a of the present disclosure, the heat pipe is also disposed on the side region of circuit board 450 so that the heat pipe can fill the role of the reinforcing plate 460. Although one channel formed of one vapor cavity 410 and one wick 420 is illustrated, a plurality of channels can be provided in some embodiments. For example, since side walls of the channel are higher than the reinforcing plate 460, the channel also plays a role in reinforcing the side region of the circuit board 450. In the handheld device (a), the circuit board 450 and the heat pipe are bonded to each other using the heat sinking material 440.

Figure 5:
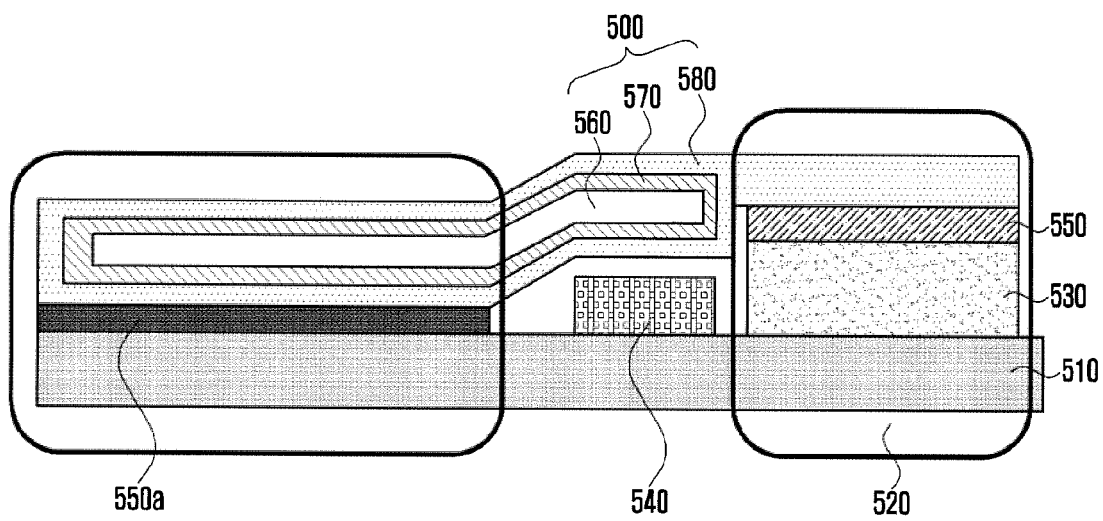
FIG. 5 illustrates a cross-sectional view of the handheld device according to an embodiment of the present disclosure.

FIG. 5 illustrates a cross-sectional view of the handheld device according to an embodiment of the present disclosure. More specifically, FIG. 5 is a cross-sectional view taken along a line corresponding to line X1 in FIG. 3. In the handheld device, the heat pipe 500 is bent on a portion where an electronic component 530 is mounted, to pass above a H/W component 540. A portion 520, on which a highest electronic component 530, such as an AP, is mounted, does not have a space in which the heat pipe 500 is stacked in a z-axis direction. Thus, only the heat conductive member 580 of the heat pipe is formed on the electronic component 530. The heat conductive member 580 is capable of transferring heat to the channel constituted with the vapor cavity 560 and the wick 570 by heat conduction through a material having excellent heat conductivity. The heat transferred to the channel in this way can be absorbed to the medium through the vapor cavity 560 and the wick 570 as vaporization heat.

The electronic component 530 and the circuit board 510 can be bonded to the heat pipe 500 through a double-sided tape having excellent heat conductivity or a material having excellent heat conductivity. For example, a heat sinking material 550 can be interposed between the circuit board 510 and the heat pipe 500 to improve heat transfer performance. The heat sinking material 550 can be a Thermal Interface Materials (TIM). The heat sinking interface material 550 can be made of a Phase Change Material (PCM) 550a.

Although the circuit board 510 and the heat pipe are bonded to each other in order to reinforce the strength, the circuit board 510 and the heat pipe are bonded to each other mainly for the purpose of improving a heat dissipation effect. Since a conductive layer of the circuit board 510 is made of copper having excellent heat conductivity, the heat conductivity of the circuit board can be improved so that the effect of the heat pipe can be maximized.

Figure 6A:
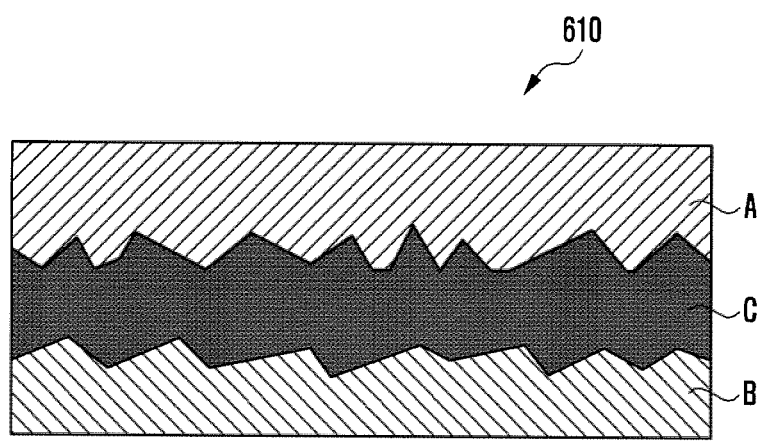
FIGS. 6A to 6B illustrate examples of bonding a phase change material to a circuit board according to embodiments of the present disclosure.
Figure 6B:
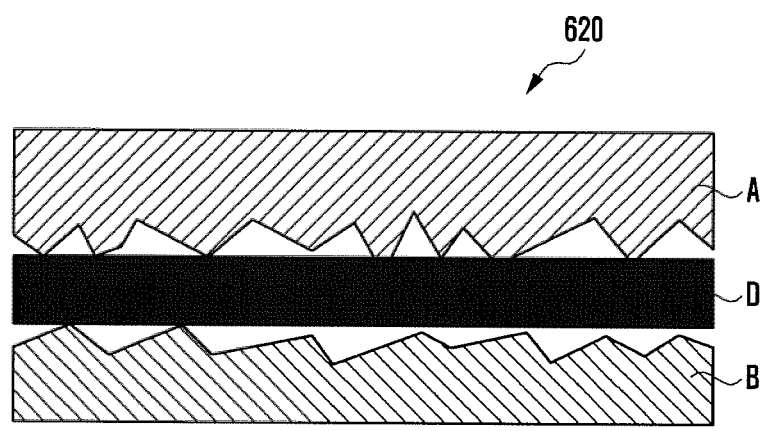

FIGS. 6A and 6B illustrate examples of bonding a phase change material to a circuit board according to an embodiment of the present disclosure. Referring to FIGS. 6A and 6B of reference number 610, the heat pipe can be deformed at temperature over 180° C. Accordingly, the circuit board B and the heat pipe A can be bonded to each other using a phase change material C which is a solid at room temperature but is changed to a gel state at a temperature over a certain level. Accordingly, the phase change material C is excellent in heat conductivity and is capable of reinforcing the adhesion strength between the circuit board B and the heat pipe A. As illustrated in FIGS. 4A and 4B, the reinforcing plate is provided to reinforce the strength so as to prevent flexural or fracture caused by force at the time of assembly or disassembly. However, since the assembly or disassembly is performed manually at room temperature, the operation cannot be performed at a temperature over 45° C. Thus, since the phase change material C is in the solid state at a temperature below 40° C., the phase change material C does not have a problem as an adhesive for maintaining the adhesion of the circuit board B and the heat pipe A.

In addition, when the bonding is performed at a temperature over 50° C., the phase change material C is in the gel state. Thus, the phase change material C is capable of filling fine unevenness between bonded surfaces, thereby removing air gap which is highly insulative. That is, when the circuit board is merely placed on the heat pipe A previously coated with the phase change material C just after the circuit board have been discharged from a Surface Mounting Device (SMD) at a temperature of, for example 270° C. or higher, the circuit board B and the heat pipe A can be simply bonded to each other. When the heat pipe A and the circuit board B are bonded to each other at room temperature using the phase change material C, the bonding can be easily performed by using a processing instrument heated to a temperature of about 50° C. In particular, since the phase change material C is in the gel state to be softened at a temperature of 50° C. or higher, even if a very large gap is formed between the circuit board B and the heat pipe A, the phase change material C is spread to fill the gap between the circuit board B and the heat pipe A. Thus, there will be no problem in bonding.

Referring to reference number 620, an ordinary pad-shaped material D cannot fill unevenness between bonded surfaces. Accordingly, the ordinary pad-shaped material D may not fill the gap between the circuit board B and the heat pipe A.

The phase change material C can strengthen the bonding force between the circuit board B and the heat pipe A while reducing thermal resistance therebetween.

Figure 7A:
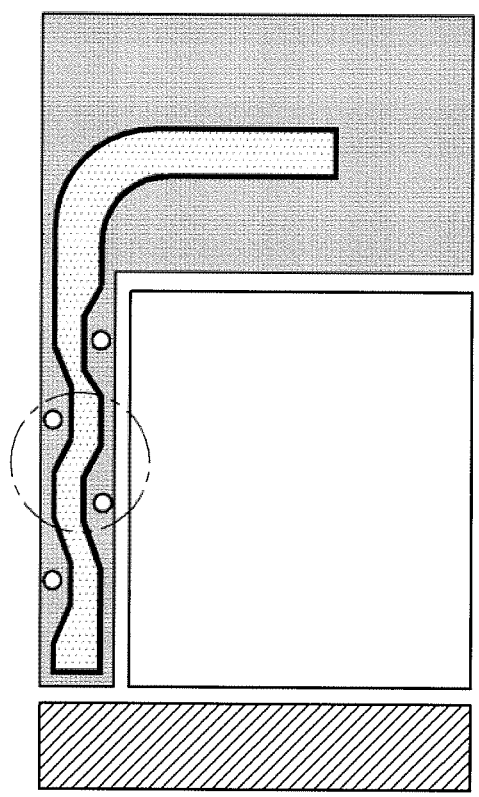
FIGS. 7A and 7C illustrate an example in which a heat pipe is applied to a handheld device according to an embodiment of the present disclosure.
Figure 7B:
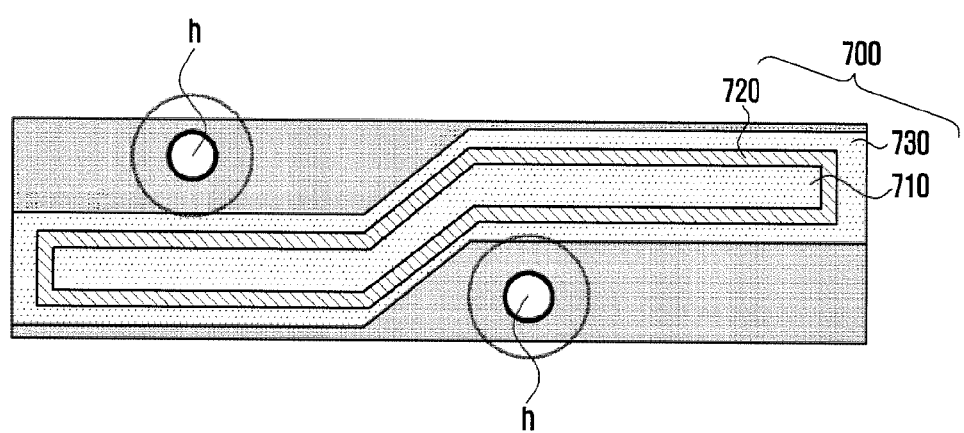
Figure 7C:
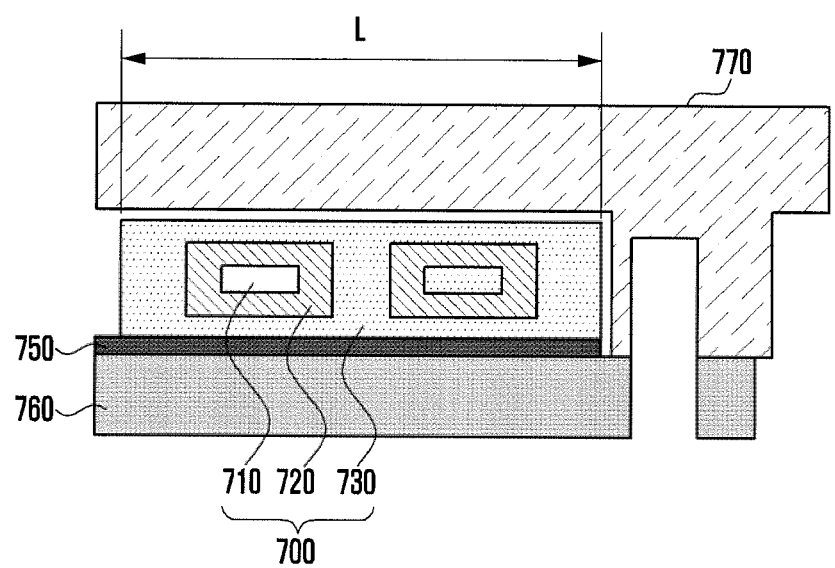

FIGS. 7A and 7C illustrate examples in which a heat pipe according to an embodiment of the present disclosure is applied to a handheld device.

Referring to FIGS. 7A and 7B, the heat pipe can include a vapor cavity 710, a wick 720, and a heat conductive member 730. In general, the heat pipe is manufactured in an elongated tubular shape that is cut into a proper length and inserted into a mounting space after it is bent to be suitable for the shape of the mounting space. In the circuit board on which the heat pipe is disposed, screw holds h are formed on both sides of the heat pipe. Accordingly, the width of the heat pipe should be set considering the screw holes h, as well. Thus, the width of the heat pipe is narrowed and the heat to be transferred by the heat pipe can be reduced.

That is, referring to FIG. 7C, the circuit board 760 is bonded with the heat pipe 700 by a heat sinking interface material 750. However, there is a disadvantage in that the entire width L of the heat pipe is narrowed due to the screw holes h. The heat pipe 700 can include two channels. The screw holes h can interconnect the circuit board 760 and the external case 770.

Accordingly, the effective width of the heat pipe can be determined in consideration of the screw holes h, as well.

Figure 8A:
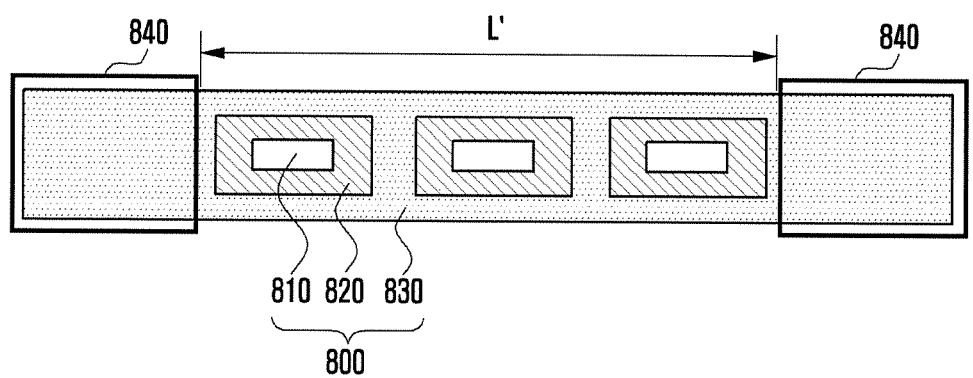
FIGS. 8A to 8C are views illustrating an example in which a heat pipe is applied to a handheld device according to another embodiment of the present disclosure.
Figure 8B:
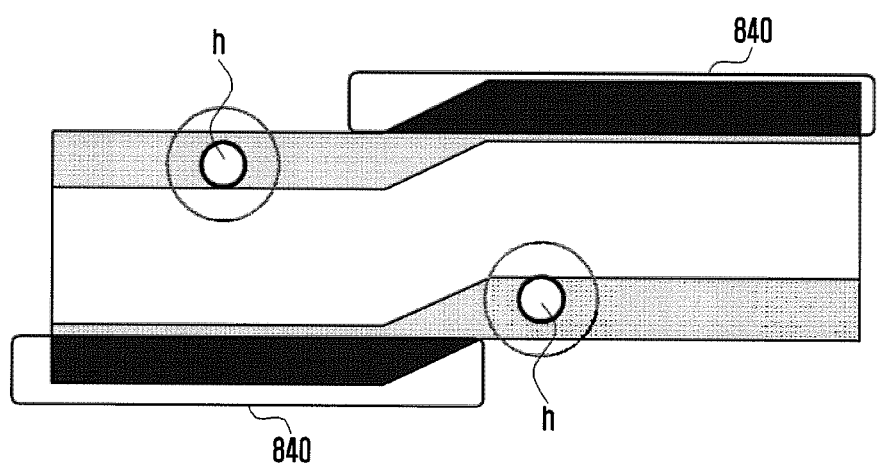
Figure 8C:
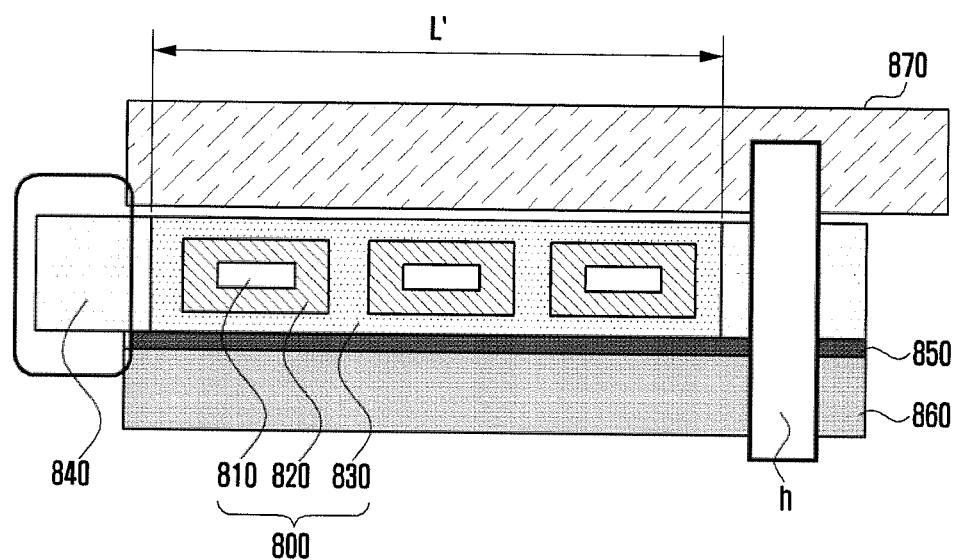

FIGS. 8A to 8C are views illustrating an example in which a heat pipe according to another embodiment of the present disclosure is applied to a handheld device.

Referring to FIG. 8A, the heat pipe can include a vapor cavity 810, a wick 820, and a heat conductive member 830. The heat conductive member 830 can include a dummy region 840 expanded to screw holes h formed in side regions of a circuit board.

Referring to FIG. 8B, after the heat pipe is bonded to the circuit board, the dummy regions 840 formed as outskirts of the circuit board can be removed. Accordingly, the heat conductive member 830 of the heat pipe can be expanded to the dummy region 840 so that the sizes of the vapor cavity 810 and the wick 820 within the heat conductive member 830 can be increased. That is, the size of the vapor cavity 810 or the size of the wick 820 can be determined according to the dummy region 840.

That is, referring to FIG. 8C, the entire width L' of the heat pipe 800 can be widened compared to the entire width of the heat pipe of FIG. 7C so that the heat pipe 800 can include three channels. The circuit board 860 is bonded with the heat pipe 800 by a heat sinking interface material 850. A screw hole h can interconnect the circuit board 860 and an external case 870. Accordingly, even if the dummy region 840 formed as a outskirt of the circuit board 860 is removed, a part of the dummy region 840 of the heat conductive member 830 made of a metal which is excellent in heat conductivity remains so that the heat conductivity can be further enhanced.

Figure 9A:
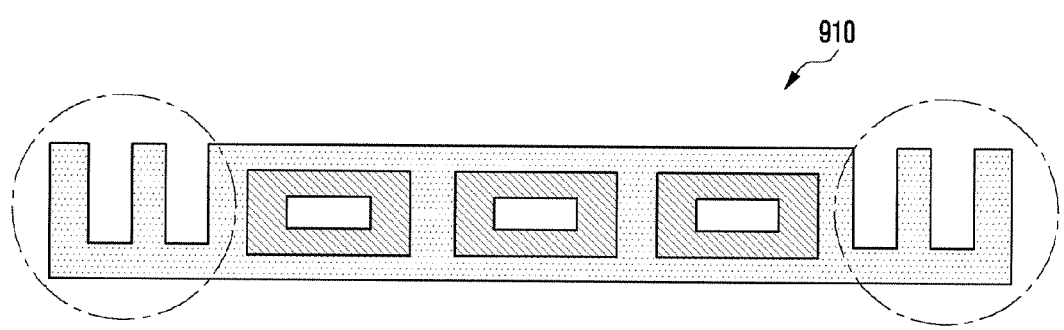
FIGS. 9A to 9C illustrate shapes of dummy regions according to embodiments of the present disclosure.
Figure 9B:
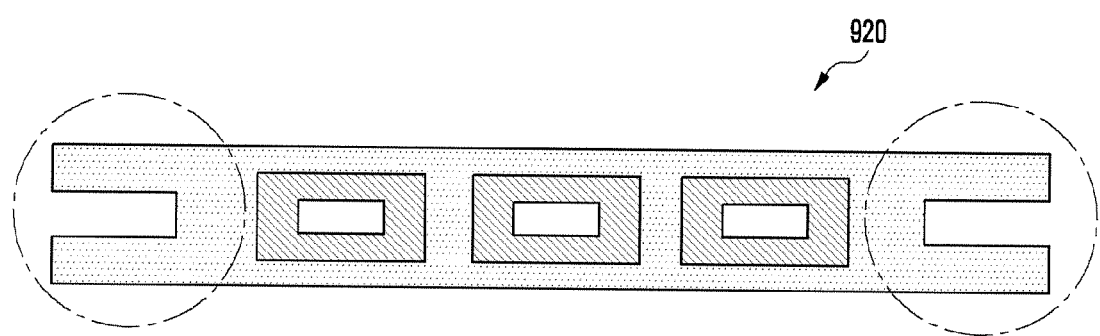
Figure 9C:
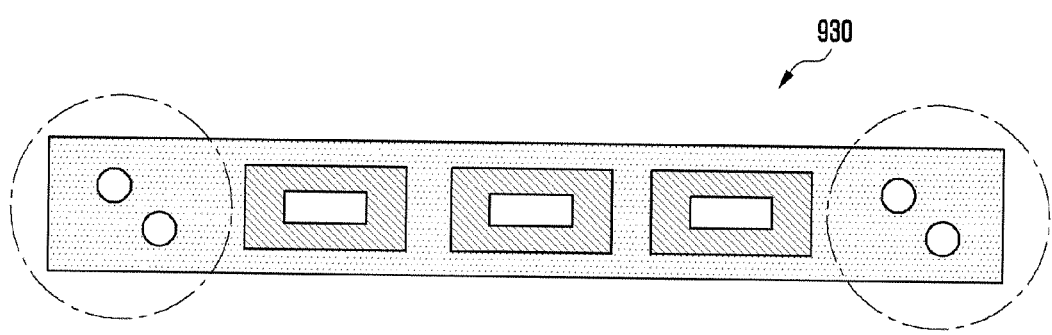

FIGS. 9A to 9C illustrate shapes of dummy regions according to embodiments of the present disclosure. Referring to FIGS. 9A to 9C, when dummy regions, which are side regions of a heat pipe manufactured in an elongated tubular shape, are too large and thus, the dummy regions extending out of the circuit board are removed, the wasted dummy regions are increased so that the heat pipe can give poor performance for its price. Accordingly, referring to reference number 910, the dummy regions can include slot holes. The slot holes can be alternately formed on both sides or the left and right slot holes can be formed in the opposite directions. The dummy regions can be formed in at least one of a concave-convex shape 920, a polygonal shape, and a hole 930.

According to an embodiment of the present disclosure, the entire temperature of a handheld device can be reduced by interconnecting a high heat generating portion and a cold portion in the handheld device with each other by a heat pipe.

According to an embodiment of the present embodiment, the performance of a handheld device can be improved by applying a heat pipe to the handheld device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A handheld device comprising:
a circuit board including at least one electronic component;
a heat pipe disposed on the at least one electronic component, wherein the heat pipe comprises:
an evaporation section absorbs heat generated from the at least one electronic component,
a condensation section releases the absorbed heat in a direction opposite to the at least one electronic component,
a connection section provided on a side of the circuit board and structured with a bend at a predetermined angle from the evaporation section to an end of the condensation section,
a vapor cavity,
a wick surrounding the vapor cavity, and
a heat conductive member formed to surround the wick;
wherein the heat conductive member comprises at least one dummy region;
wherein a size of the vapor cavity or a size of the wick is determined depending on the at least one dummy region; and
a heat sinking material bonds the circuit board and the heat pipe to each other,
wherein the connection section is formed between the circuit board and an auxiliary board and is superposed with a side region of the circuit board facing a battery.

2. The handheld device of claim 1, wherein the condensation section is disposed at a longer distance from the at least one electronic component than the evaporation section.

3. The handheld device of claim 1, wherein:
the vapor cavity causes a phase change of a medium and transfer the medium subjected to the phase change to the condensation section; and
the wick surrounding the vapor cavity transfers the medium released from the condensation section to the evaporation section.

4. The handheld device of claim 3, wherein the connection section is constituted with the heat conductive member.

5. The handheld device of claim 3, wherein the heat conductive member is made of at least one of aluminum (Al), copper (Cu), silver (Ag), titanium (Ti), chrome (Cr), gold (Au), carbon (C), nickel (Ni), ferrite (Fe), platinum (Pt), graphite, and boron nitride (BN), or a combination thereof.

6. The handheld device of claim 1, the heat conductive member comprises a dummy region expanded to a screw hole formed in the side region.

7. The handheld device of claim 6, wherein the dummy region includes a slot hole.

8. The handheld device of claim 6, wherein the dummy region is formed in at least one of a convex-concave shape, a polygonal shape, and a hole.

9. The handheld device of claim 1, wherein the heat sinking material includes a Thermal Interface Material (TIM).

10. The handheld device of claim 9, wherein the heat sinking interface material is made of Phase Change Material (PCM).

11. The handheld device of claim 10, wherein the PCM is interposed between the circuit board and the heat pipe in a gel state.

12. The handheld device of claim 1, wherein the circuit board is disposed on one of an upper side, a lower side, and a lateral side of a battery.

13. The handheld device of claim 1, wherein the handheld device is one of a smartphone, a tablet personal computer, a mobile phone, a video phone, an e-book reader, a Personal Digital Assistant (PDA), a Portable Multimedia Player (PMP), and an MP3 player.

14. The handheld device of claim 1, further comprising an electronic component including a microprocessor.

15. The handheld device of claim 1, wherein the at least one dummy region is formed where there is not enough space for the vapor cavity in a z-axis direction.

16. A handheld device comprising:
a main board on which a main processor is mounted;
an auxiliary board comprising at least one electronic component positioned opposite to the main processor; and
a heat pipe comprising:
an evaporation section disposed on the main processor and absorbs heat generated from the main processor;
a connection section disposed on a side region of the main board and structured with a bend at a predetermined angle from the evaporation section to an end of a condensation section, wherein the connection section transfers the absorbed heat in a direction opposite to the main processor; and
the condensation section releases the transferred heat in a direction opposite to the main processor;
wherein the heat pipe further comprises a vapor cavity, a wick surrounding the vapor cavity, and a heat conductive member formed to surround the wick;
wherein the heat conductive member comprises at least one dummy region; and
wherein a size of the vapor cavity or a size of the wick is determined depending on the at least one dummy region,
wherein the connection section is formed between the main board and an auxiliary board and is superposed with a side region of the main board facing a battery.

17. The handheld device of claim 16, wherein the handheld device is one of a smartphone, a tablet personal computer, a mobile phone, a video phone, an e-book reader, a Personal Digital Assistant (PDA), a Portable Multimedia Player (PMP), and an MP3 player.

18. The handheld device of claim 16, wherein the at least one dummy region is formed in at least one of a convex-concave shape, a polygonal shape, and a hole.

* * * * *